Jan. 5, 1937.　　　　R. W. DINZL　　　　2,067,140
TORSION IMPACT TESTING APPARATUS
Filed Aug. 17, 1935　　　2 Sheets-Sheet 1
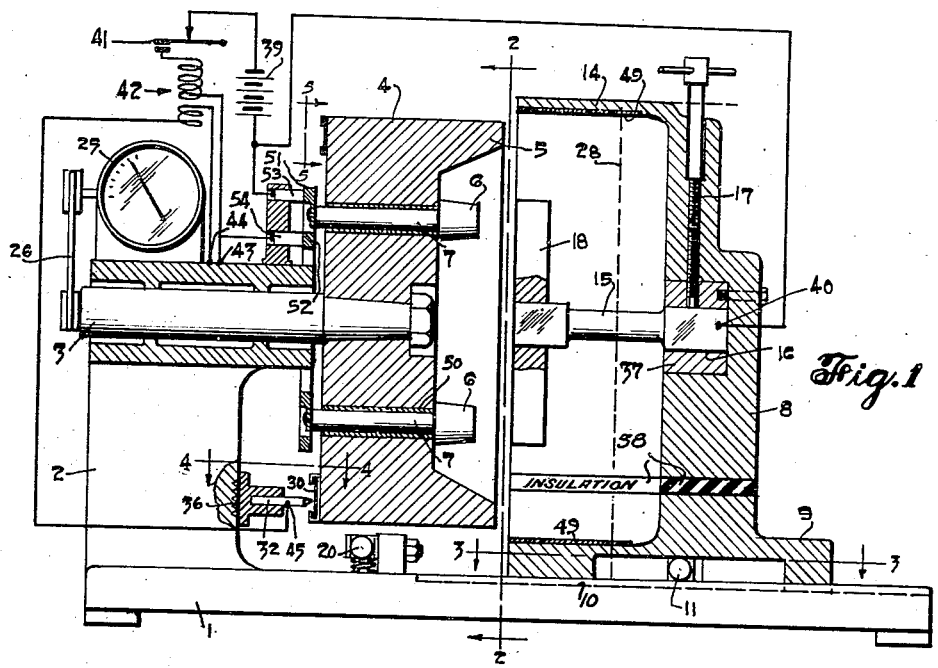
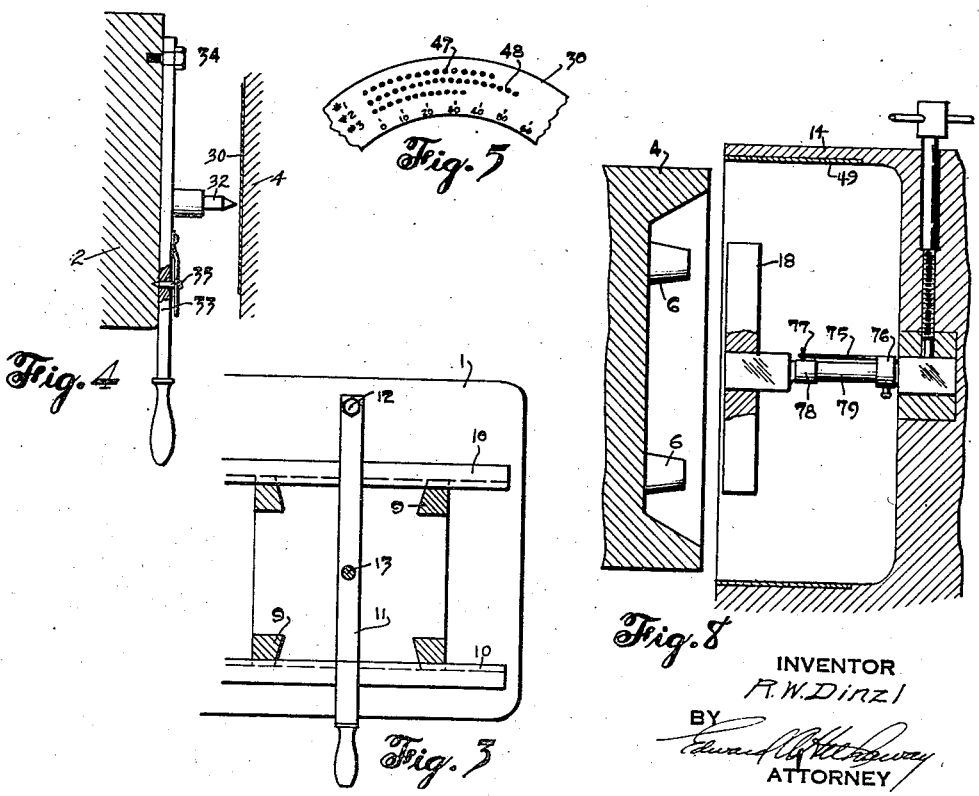
INVENTOR
R. W. Dinzl
BY
ATTORNEY Jan. 5, 1937.    R. W. DINZL    2,067,140
TORSION IMPACT TESTING APPARATUS
Filed Aug. 17, 1935    2 Sheets-Sheet 2
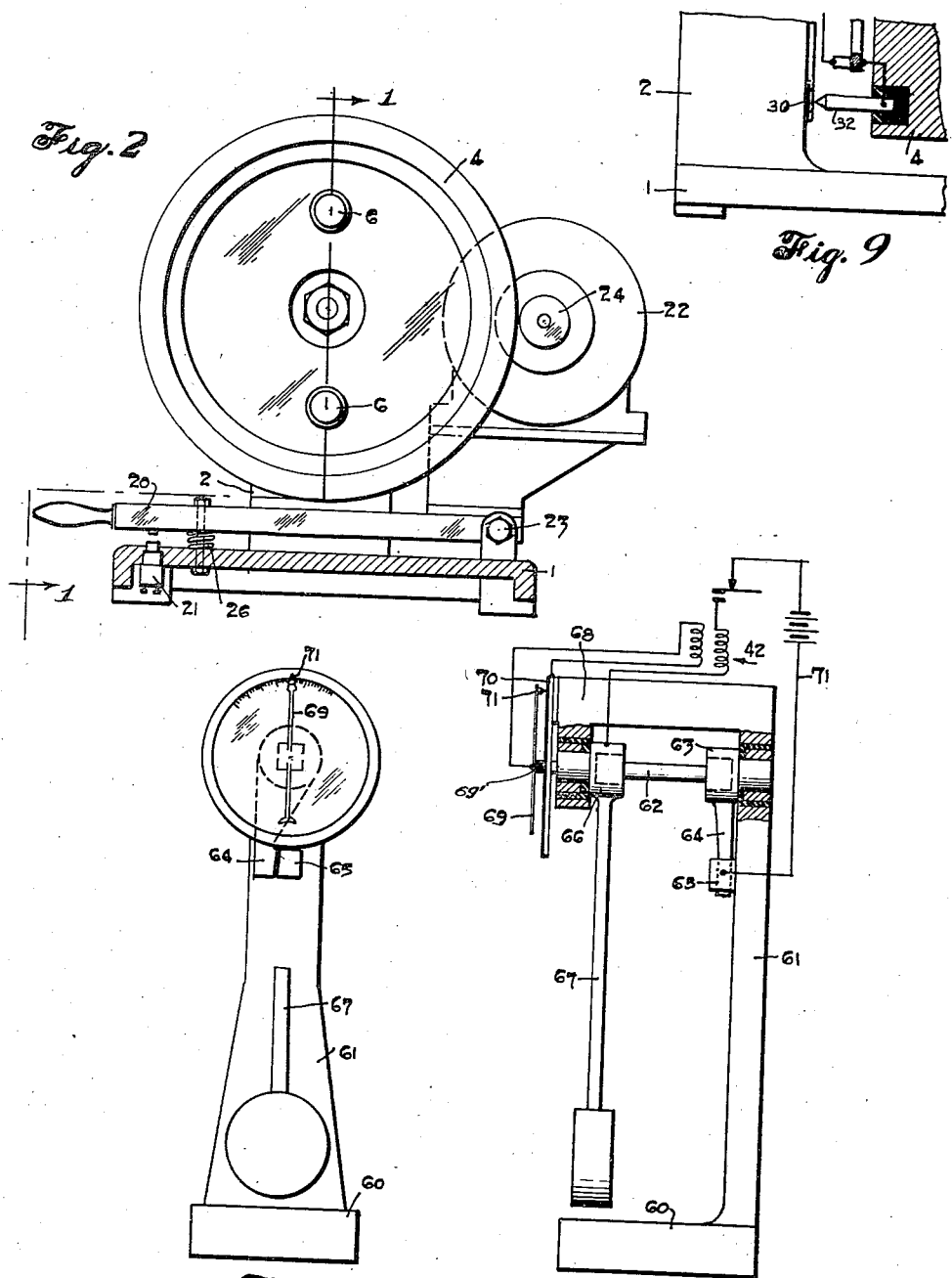
INVENTOR
R. W. Dinzl
BY
ATTORNEY Patented Jan. 5, 1937

2,067,140

UNITED STATES PATENT OFFICE 2,067,140

TORSION IMPACT TESTING APPARATUS

Richard W. Dinzl, Narberth, Pa., assignor to Baldwin-Southwark Corporation, a corporation of Delaware Application August 17, 1935, Serial No. 36,636

15 Claims. (Cl. 265—13)

This invention relates generally to torsion impact testing apparatus and more particularly to an improved machine and means for determining the degree of torsion of a test specimen up to the point of failure thereof.

The development of torsion impact testing as brought about by the invention of G. V. Luerssen and O. V. Greene, Patent Number 1,962,604, has been limited merely to determining the energy required to produce failure of the specimen. No knowledge has been available from such tests as to the degree of torsion of the specimen before failure.

It is one object of my invention to provide improved means and apparatus for determining the degree of torsion up to the point of failure of a specimen, and it is a further object to provide such means in a manner that will accomplish this result in a simple, inexpensive and effective manner regardless of the fact that the degree of torsion to be measured may be of very short duration.

It is another object of my invention to accomplish these results either electrically or mechanically and preferably to produce a permanent record of such results. A further object is to produce a machine that will permit effective and rapid tests to be made.

Other objects and advantages will be more apparent to those skilled in the art from the following description of the accompanying drawings in which:

Fig. 1 is a partial sectional view of a torsional impact machine embodying improved features of the machine and means for determining the degree of torsion before failure of the specimen, the section being taken on line 1—1 of Fig. 2;

Fig. 2 is a vertical transverse section taken on the line 2—2 of Fig. 1;

Fig. 3 is a horizontal section taken on the line 3—3 of Fig. 1;

Fig. 4 is a horizontal section taken on the line 4—4 of Fig. 1;

Fig. 5 is an elevational view of a record chart viewed in the direction of the line 5—5 of Fig. 1;

Fig. 6 is a sectional view of a pendulum type impact tester embodying my invention;

Fig. 7 is an end view of the left end of the device shown in Fig. 6;

Fig. 8 is a fragmentary longitudinal view of mechanical means for determining the degree of torsion of a specimen before failure thereof;

Fig. 9 is a modification of a spark recording electrode and chart.

In the particular embodiments of the invention which are shown herein merely for the purpose of illustrating certain specific forms among others that the invention might take in practice, I have disclosed in Fig. 1 a torsion impact machine having a base 1 and a pedestal 2 rigidly secured thereto. Suitably journalled in pedestal 2 is a shaft 3 which carries a flywheel 4. This flywheel has an annular flange 5 completely enclosing a pair of lugs 6 which are rigidly connected to flywheel 4 preferably by shanks 7 extending through and securely held in the flywheel. A pedestal 8 has a base 9 horizontally or axially adjustable in a slideway 10 of machine base 1. As shown in Fig. 3, a hand lever 11 is pivoted at 12 to the machine base and at 13 to the pedestal base 9. The pivot 13 may be sufficiently loose to compensate for any angularity between the lever and slideways 10. An annular enclosure cover 14 projects axially from pedestal 8 and is of such inner diameter as to generally telescopically receive flywheel 4. A specimen 15 is secured at one end against relative rotation with respect to flywheel 4 by a suitable socket 16 in pedestal 8. A set screw or other suitable means 17 may be employed to firmly hold the specimen in socket 16, the other end of the specimen having a cross bar 18 adapted when axially moved to be engaged by the diametrically opposed impact lugs 6.

In the operation of the machine so far described, when the specimen and cross arm 18 are assembled in the manner shown in Fig. 1, the operator first causes flywheel 4 to be rotated by depressing a lever 20 thereby closing a switch 21 to simultaneously start a motor 22 and tilt the motor about a pivot 23. Upon tilting the motor, a friction wheel 24 engages the periphery of flywheel 4 and causes rotation thereof. When the flywheel has attained a predetermined speed as indicated by a speedometer or tachometer 25 driven from the end of shaft 3 by belt 26, the operator releases lever 20 to permit motor 22 and friction wheel 24 to be moved to its inoperative position by a spring 26, Fig. 2. Thereupon the operator moves hand lever 11 to the left, Figs. 1 and 3, thus laterally or axially shifting pedestal 8, annular flange 14 and the specimen with its cross bar 18 whereupon impact lugs 6 engage cross bar 18 and impart a torsional impact to specimen 15. Upon breakage of the specimen, cross bar 18 or chips from specimen 15 may fly outwardly but these will be intercepted by annular flange 14 which at the moment of impact has telescopic or cooperative closure relation with flywheel 4. After the specimen is broken, hand lever 11 is moved entirely to the right so that annular flange 14 is entirely clear of the flywheel as indicated by the dotted line position 28. The residual momentum in flywheel 4 will be indicated by tachometer 25. The difference between the original speed and the residual speed is an indication of the energy required to break the specimen. The operator, without slowing down or stopping the flywheel 4, may easily and expeditiously remove the broken portion of specimen 15 from its socket 16 and insert a new specimen. During this operation the operator is entirely protected from impact lugs 6 due to flange 5 of the flywheel completely covering the same while the annular cooperating or telescopic cover 14 insures ample protection to the operator when the specimen fails. All of the foregoing features have been found to very greatly increase the speed of performing repeated tests with this type of machine.

In order to determine the degree of torsion up to the point of failure of the specimen, I have provided improved means for recording the same. In one form this includes a record chart 30, Fig. 5, which for convenience is arcuate and insertable between suitable arcuate guides secured to the back side of flywheel 4. These guides and chart may be of any suitable circumferential length, and it is preferable that two such charts should be diametrically located on the flywheel as shown in Fig. 1 at 30 for reasons that will appear presently. A high tension electrode 32 is located adjacent the rear side of flywheel 4 so as to permit a spark to pass through record chart 30 during torsion of the specimen. This electrode may be either stationary or it may be successively adjusted radially of the chart in order to record a series of tests on one chart. To this end, the electrode may be supported in a lever 33, one end of which is pivoted at 34 while its other end may be held in any adjustable position by a releasable pawl and detent 35, there being as shown in Fig. 1 a series of detents 36. To utilize this vertical adjustment of the electrode, it is preferable that the same be located vertically beneath the axis of shaft 3. The ability to make multiple records on a single chart is desirable in view of the fact that the flywheel 4 is not stopped when a new specimen is being inserted.

To establish current for electrode 32, starting from the instant that cross bar 18 engages impact lug 6, I can employ anyone of several arrangements. One is to suitably electrically insulate the right end of specimen 15 with respect to machine base 1. Such insulation may be a heavy insert 37 surrounding the end of the specimen or it may be a sheet of insulation 38 separating base 9 from pedestal 8 and hood 14. An electric battery 39 is suitably connected to the specimen as diagrammatically indicated at 40, while the other end of the battery is connected to a make and break contact 41 of an auto transformer 42 whose primary coil is connected at 43 to the machine frame and therefore to the impact lugs 6 through the shaft 3 and flywheel 4. The high tension or secondary coil of the transformer is also connected to the machine frame at 44 and to electrode 32 as at 45, this electrode being suitably insulated.

In operation of the foregoing, at the instant when impact lugs 6 engage cross bar 18, a circuit is established for primary coil 42 from battery 39 thence through contact 40, specimen 15, cross bar 18, lugs 6, flywheel 4, contact 43 and to the other side of the battery through coil 42 and make and break contacts 41. A high secondary voltage sparks from electrode 32 through the record paper 30 to flywheel 4 to complete the circuit back to the secondary coil. The sparking will continue so long as the specimen 15 remains intact and cross bar 18 remains in engagement with lugs 6. However, upon failure of specimen 15, the primary circuit therethrough will be instantly broken even though cross arm 18 should momentarily remain in contact with lugs 6. When the primary circuit is thus broken, the secondary circuit for electrode 32 is instantly broken, thus terminating sparking through the record chart 30. The chart will thus show a series of holes 47 burnt therein through a certain angular rotation of the flywheel, thus indicating the degree of torsion up to the point of failure. In the next test, the operator may either stop the flywheel and replace the chart with a new one or he may move electrode 32 radially inwardly by hand lever 33 so that the next record may be made along an arcuate line 48. The chart may be arranged for any number of such tests. Upon failure of the specimen if the cross bar 18 should fall down and lie across flywheel 4 and annular flange 14, a connection may be made to energize the primary circuit. To avoid this, the inner face of flange 14 may be provided with a layer of insulating material 49.

Another method by which the primary circuit may be energized is to insulate shanks 7 of the impact lugs 6, such insulation being diagrammatically indicated at 50. A circular slip ring 51 may be secured to one of the shanks 7 while a concentric slip ring 52 may be secured to the other shank 7. In this case the two ends of the primary circuit can be connected to rings 51 and 52 through brushes 53 and 54. Hence it is seen that when crossbar 18 is engaged by impact lugs 6, the primary circuit will be established to produce a record as above described.

In the modification of Fig. 6, I have shown a pendulum type torsion impact testing machine comprising a base 60 and pedestal 61. One end of the specimen 62 is secured in a holder 63 which in turn is suitably journalled in pedestal 61. A cross bar 64 is formed as a part of the holder 63 and is adapted for engagement with an impact lug 65 secured to pedestal 61. The other end of the specimen is secured in a hub 66 of a pendulum 67 whose lower end is suitably weighted. Hub 66 in turn is journalled in a laterally projecting portion 68 of pedestal 61. An indicator hand 69 is secured to the outer end of hub 66 and suitably insulated therefrom as indicated at 69' so as to indicate the angular movement of the pendulum. Secured to frame portion 68 is a circular disc 70 upon which an arcuate record sheet may be supported.

In the operation of Fig. 7, the pendulum 67 is manually moved a predetermined number of degrees depending upon the energy desired to be stored in the pendulum. The pendulum is then released, whereupon arm 64 will engage impact lug 65 to cause a torsional failure of specimen 62. At the instant of contact between elements 64 and 65, the primary circuit 71 will be energized by flow of current through elements 65, 64, specimen 62 and thence back to the primary winding 42. The secondary circuit will thus be established from the secondary coil through a pointer 69 to make a spark from a suitable electrode 71 on the end of the pointer through a paper chart on disc 70 and thence back through the disc to the secondary coil.

In the modification shown in Fig. 8, a scratch record is made of the angular deflection and such a record may be accurately interpreted and determined by a microscope if magnification is necessary. This arrangement consists of a finger 75, one end of which is secured as at 76 to the specimen and the other end 77 of which freely rests through a scratch pointer either on the surface of the specimen or on a suitable record sheet 78 secured thereto. In operation of this form, at the instant of contact between the cross bar 18 and impact lugs 6, the left end of the specimen 79 will rotate relative to the right end thereof, thus causing the marker end 77 to scratch a circumferential line on the specimen. At the instant of failure, the left end of the specimen together with cross bar 18 will drop and thus discontinue the scratching action by pointer 77. The extent of the foregoing line will determine the degree of torsion of the specimen before failure.

From the foregoing disclosure of the several modifications, it is seen that I have provided a very simple and yet most effective and accurate means for determining the degree of torsion before failure of a specimen during a torsion impact test thereof and which means may be applied to new or existing equipment at a relatively small cost.

It will of course be understood that various changes in details of construction and arrangement of parts may be made by those skilled in the art without departing from the spirit of the invention as set forth in the appended claims.

I claim:

1. In combination, a torsion impact testing machine having means for subjecting a test specimen to torsion impact, indicating means, and means whereby the same is automatically responsive to the degree of torsion of a specimen.

2. In combination, a torsion impact testing machine, torsion indicating means, and means whereby the same is rendered operative automatically when torsion is initially applied to a specimen.

3. In combination, a torsion impact testing machine, torsion indicating means, and means whereby the same is rendered operative automatically when torsion is initially applied to a specimen and is rendered inoperative when the specimen fails.

4. In combination, a torsion impact testing machine, electrical torsion indicating means, and means for controlling the same automatically in accordance with the initial application of torsion to the specimen and in accordance with subsequent failure thereof.

5. In combination, mechanism for subjecting a test specimen to torsional impact, and means for determining the degree of torsion of the specimen before failure thereof including an electric circuit which is broken upon failure of the specimen.

6. In combination, mechanism for subjecting a test specimen to torsional impact, and means for determining the degree of torsion of the specimen before failure thereof including an electric circuit passing through the specimen whereby upon failure thereof the circuit is broken.

7. In combination, mechanism for subjecting a test specimen to torsional impact, and means for determining the degree of torsion of the specimen before failure thereof including an arm and a lug adapted to have impact contact with said arm, and an electrical circuit adapted to be controlled in accordance with the impact between the arm and lug.

8. In combination, mechanism for imparting torsional impact to a test specimen, a chart, and means for electrically indicating on said chart the degree of torsion of the specimen up to the point of failure thereof.

9. In combination, mechanism for subjecting a specimen to torsional impact, a chart and an electrode, one of which is movable with a portion of the specimen during torsion thereof and the other of which is stationary, and electrical means producing a current adapted to be discharged from said electrode and through said chart while the specimen is subjected to torsion.

10. In combination, mechanism for subjecting a specimen to torsional impact, a chart and an electrode, one of which is movable with a portion of the specimen during torsion thereof and the other of which is stationary, electrical means producing a current adapted to be discharged from said electrode and through said chart while the specimen is subjected to torsion, and means for effecting adjustment between said chart and electrode to obtain a plurality of records on a single chart.

11. In combination, mechanism for subjecting a test specimen to torsional impact including a momentum member movable about an axis, and means for indicating the degree of torsion of a specimen up to failure thereof including a chart and marking elements, one of which is movable with said momentum member and the other of which is stationary.

12. In combination, mechanism for subjecting a test specimen to torsional impact, and means for indicating the degree of torsion of the specimen up to the point of failure thereof including means associated with the two end portions of the specimen whereby the indicating operation is automatically discontinued upon failure of the specimen at an intermediate point thereof.

13. In combination, mechanism for imparting torsional impact to a test specimen, a flexible finger having one end secured to one end portion of a specimen and the other end of the finger being substantially free, means whereby said free end is adapted to scribe a line circumferentially of the specimen during torsion thereof, and means whereby upon failure of the specimen said free end and specimen are relatively separated.

14. A torsional impact testing machine comprising, in combination, a continuously movable momentum member, means for supporting a test specimen, means for effecting relative axial movement between said momentum mechanism and specimen, and means adapted to enclose said specimen during torsion thereof and to uncover the specimen after it is broken or during insertion of a specimen in its support.

15. A torsional impact machine including a continuously moving momentum member, and means for imparting torsion from said member to a specimen including axially movable means adapted for cooperation with one end of the specimen, and a hood movable with said means and adapted to automatically enclose the specimen during torsion thereof and to uncover the same when a new specimen is to be inserted.

RICHARD W. DINZL.